No. 787,567.

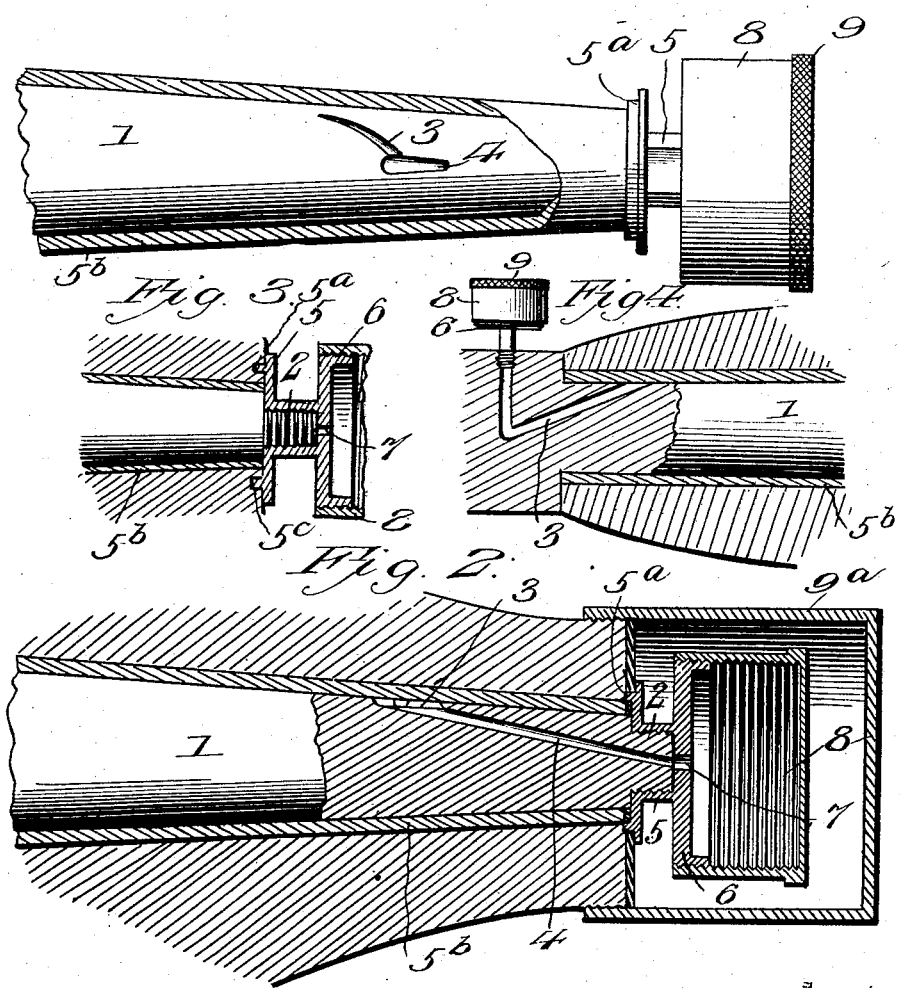

Patented April 18, 1905.

UNITED STATES PATENT OFFICE.

FRANK E. ECKHART, OF PULLMAN, WEST VIRGINIA.

LUBRICATOR.

SPECIFICATION forming part of Letters Patent No. 787,567, dated April 18, 1905.

Application filed August 29, 1903. Serial No. 171,285.

*To all whom it may concern:*

Be it known that I, FRANK E. ECKHART, a citizen of the United States, residing at Pullman, in the county of Ritchie and State of West Virginia, have invented new and useful Improvements in Lubricators, of which the following is a specification.

My invention relates to lubricators; and its primary object is to provide new and useful devices of this character adapted to be secured to the axle of a vehicle to supply the same with lubricant and secure the wheels of the vehicle in applied position.

A further object of the invention is to provide lubricators which are adapted to have the lubricant fed therefrom under pressure in such manner that any desired quantity may be supplied to the axles.

A still further object is to provide novel means to render the axles and lubricators dust-proof.

The invention consists of the construction, combination, and arrangement of parts hereinafter fully described, claimed, and illustrated in the accompanying drawings, which disclose the preferred form of my invention, and in which—

Figure 1 is a fragmentary portion of an axle, the same being provided with a lubricator constructed in accordance with my invention and the axle-box being in section to disclose the lubricating-groove. Fig. 2 is a central longitudinal sectional view of a hub and axle provided, respectively, with a lubricator and cap constructed in accordance with my invention. Fig. 3 is a view similar to Fig. 2, disclosing a slight modification. Fig. 4 is a similar view disclosing a further modification.

Referring to the drawings by reference-numerals, 1 designates an axle adapted to have a wheel mounted thereon and terminating in a threaded nib 2. The axle is provided upon its upper surface with a lubricating-groove 3, which communicates with the rear end of a duct 4, having a diagonal course and terminating at a point at or near the longitudinal center of the nib 2. The duct 4 is adapted to convey lubricant from a lubricator carried by the nib 2 to the lubricating-groove 3, from which point the lubricant is distributed over the axle by the rotation of the wheel.

5 designates a nut which is mounted upon the nib 2 to retain the wheel in applied position and has the inner face thereof provided with an annular flange $5^a$, within which a washer is situated to contact with the axle-box $5^b$, and when it is desired to dispense with the use of a washer the flange $5^a$ occupies a recess $5^c$ in the outer end of the wheel-hub, as clearly illustrated in Fig. 3 of the drawings. The outer end of the shank of the nut is provided with an annular flanged head 6, adapted to form a rigid head for a cup 8, which is movably mounted thereon and which, together with the head, forms a reservoir adapted to contain a lubricant. The head is provided with an aperture 9, which is smaller than the diameter of the shank of the nut, to provide communication between the duct 4 and the interior of the reservoir, and its periphery, together with the flange, is screw-threaded to be engaged by similar threads upon the interior of the cup 8. The cup is cylindrical in contour and has one of its ends closed and through virtue of its screw-threaded connection with the head is adapted to be rotated thereon to cause its closed end to approach or recede from the head. The approach of the closed end of the cup toward the head causes the lubricant which is adapted to be contained in the reservoir to be forced through the aperture 7 and the duct to the lubricating-groove. The cup is provided with a milled ring 9, located at a point near its closed end and by means of which the cup may be rotated. The shank of the nut 5 is so constructed that it may be easily grasped by a wrench to apply or remove the lubricator. The outer extremity of the hub of the wheel is screw-threaded to receive the screw-threaded portion of a cylindrical cap $9^a$, adapted to inclose the end of the hub and lubricator to protect the lubricator and axle from sand or the elements.

In Fig. 4 of the drawings I have disclosed a slight modification of my invention, which resides in securing the lubricator on the rear of the axle. In this instance I cause the duct 4 to follow a rearward course from the lubricating-groove to terminate in the upper side of the axle a little behind the wheel-hub and provide this extremity with screw-threads. The head is provided with a depending threaded nipple 10, adapted to be received by the threaded extremity of the duct 4 to secure the lubricator in applied position.

The operation of the device may be described in the following manner: The reservoir may be supplied with lubricant by removing the cup from the head. After the cup is filled it is replaced and the lubricator secured in applied position. When it is desired to apply lubricant to the axles, the cup is turned to cause its closed end to approach the head, which movement will cause the lubricant to pass through the duct to the lubricating-groove, from which point the lubricant is distributed over the axle by the rotation of the wheel. The threads upon the head and cup are to be so constructed that one or one-half turn of the cup will supply the axle with sufficient lubricant in order to enable the operator to determine when the axles are sufficiently supplied.

It is apparent from the above description, taken in connection with the accompanying drawings, that I provide a lubricator which is cheap, durable, and efficient and by means of which an axle may be lubricated without the necessity of removing the wheel.

Having thus fully described my invention, what is claimed as new is—

In a lubricator for vehicle-axles, the combination with a hub, an axle-box, and a sand-cup upon the outer end of the hub, of an axle provided with a reduced threaded terminal and a feed-bore of restricted diameter extending through said terminal, a gasket about the outer end of the axle in rear of said terminal and bearing upon the outer end of the box, and a lubricator disposed within the sand-cup and comprising a base having a screw-threaded outwardly-extending flange, a screw-threaded inwardly-extending socket receiving the outer threaded terminal of the axle, the said base being provided with a restricted feed-outlet opening through the center of said socket and communicating with the bore in the axle, a head extending at right angles to said socket and parallel with the base-plate and bearing upon the outer shoulder of the axle and the gasket, said head being provided with an inwardly-extending annular flange surrounding said gasket and bearing upon the outer end of the hub, and a circumferential flange projecting beyond said inwardly-extending flange, a washer covering the outer end of the hub and bearing at its periphery upon the inner wall of the sand-cup and held at its inner edge between said inwardly-extending and circumferential flanges, and a screw-cap threaded upon the outwardly-extending flange of the body portion forming therewith a casing to contain a lubricant, substantially as described.

In testimony whereof I affix my signature in presence of two witnesses.

FRANK E. ECKHART.

Witnesses:
 JOHN RICHARDS,
 FRANK E. PRITCHARD.